(12) United States Patent
Ishibashi

(10) Patent No.: US 6,243,045 B1
(45) Date of Patent: Jun. 5, 2001

(54) REMOVAL DATA STORING MEDIUM HAVING LOOP ANTENNA

(75) Inventor: Takanobu Ishibashi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/272,261

(22) Filed: Mar. 19, 1999

(30) Foreign Application Priority Data

Mar. 31, 1998 (JP) .................................................. 10-086870

(51) Int. Cl.⁷ .............................. H01Q 11/12; H01Q 7/08
(52) U.S. Cl. ......................... 343/741; 343/748; 343/788; 343/866
(58) Field of Search ..................................... 343/787, 788, 343/741, 743, 744, 748, 866; H01Q 1/12

(56) References Cited

U.S. PATENT DOCUMENTS

| 4,373,163 | 2/1983 | Vandebult | 343/842 |
|---|---|---|---|
| 5,327,148 | * 7/1994 | How et al. | 343/700 MS |
| 5,646,633 | * 7/1997 | Dahlberg | 343/742 |
| 5,838,283 | * 11/1998 | Nakano | 343/741 |
| 5,977,921 | * 11/1999 | Niccolai et al. | 343/741 |
| 5,982,335 | * 11/1999 | Faraone et al. | 343/787 |

FOREIGN PATENT DOCUMENTS

| 2724263 | 3/1996 | (FR) | H01Q/1/32 |
|---|---|---|---|
| WO 89/07347 | 8/1989 | (WO) | H01Q/7/04 |

OTHER PUBLICATIONS

Patent Abstracts of Japan, Shibata, Loop Antenna for Car–to–Ground Communication, vol. 006, No. 060 (E–102) Apr. 17, 1982 & JP 57 002102 A (Hitachi LTD), Jan. 7, 1982.

* cited by examiner

Primary Examiner—Don Wong
Assistant Examiner—Hoang Nguyen
(74) Attorney, Agent, or Firm—Pillsbury Winthrop LLP

(57) ABSTRACT

An antenna device including a loop antenna main body having a predetermined aperture area, and a conductor element insulated from the loop antenna main body, connected to a ground potential, and formed in parallel with the loop antenna main body.

9 Claims, 5 Drawing Sheets

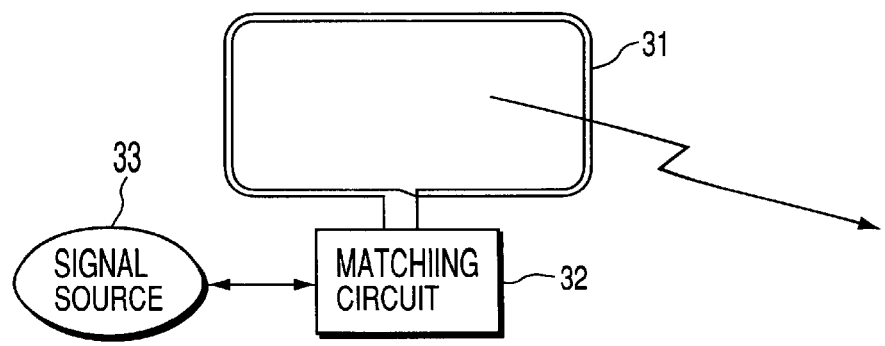
F I G. 4
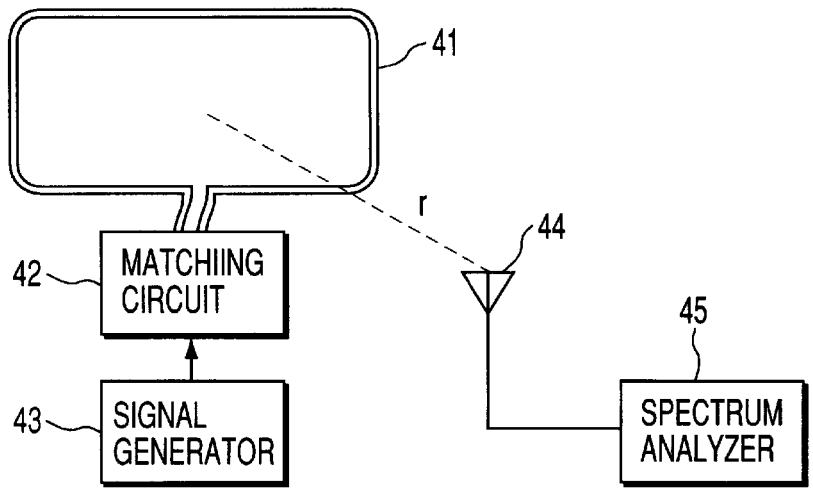
F I G. 5
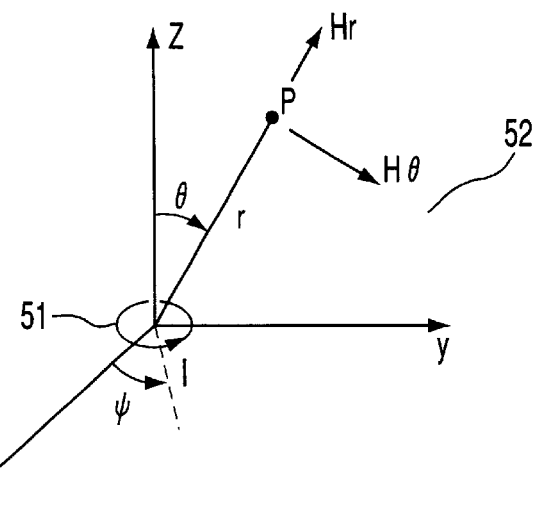
F I G. 6

FIG. 10
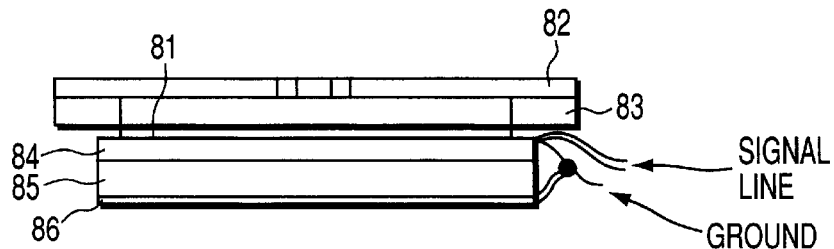
FIG. 11
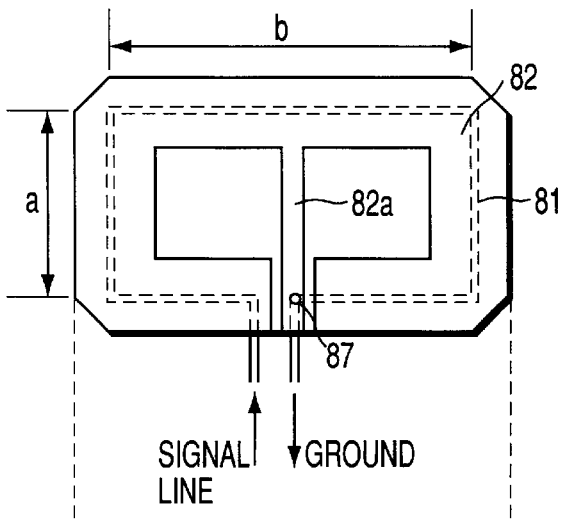
FIG. 12A
FIG. 12B
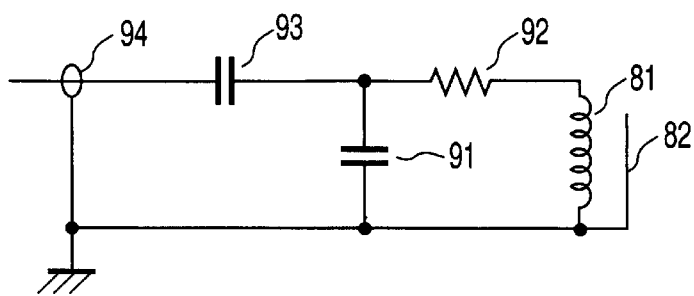
FIG. 13

REMOVAL DATA STORING MEDIUM HAVING LOOP ANTENNA

BACKGROUND OF THE INVENTION

The present invention relates to a loop antenna used for a data processing apparatus having a radio communication function for conducting radio transmission and reception between the data processing apparatus and a removable data storing medium having a radio communication function, and thereby conducting predetermined data processing such as data transmission and reception with the removable data storing medium. The present invention further relates to the removable data storing medium including this loop antenna.

In general, in a radio communication system for conducting communication using radio waves, it is necessary to use radio waves each having a strong electric field strength in order to conduct communication stably without being affected by its environment such as noise. Because of the stipulation of the radio law, however, it is impossible to radiate a radio wave having an unlimited strong electric field strength from a data processing apparatus. In the radio law, therefore, it is permitted to radiate a certain fixed strong radio wave for a specific frequency. However, the present frequency is strictly stipulated, and sufficient care is necessary for its use.

Assuming that the above described specific frequency has a wavelength $\lambda$, $\lambda/2\pi$ is located near a measurement distance of 3 m stipulated by the radio law. When calculating the strength of a radiant electric field, it is typically difficult to make the theoretical calculation coincide with actually measured values when the distance is in the vicinity of $\lambda/2\pi$. Furthermore, the environment of measurement also exerts a great influence. In other words, if an antenna is designed on a desk on the basis of various conditions and a measurement is actually conducted in the vicinity of 3 m, then a value largely different from the design value is obtained, and the radio law cannot be satisfied in many cases.

In other words, in a removable data storing medium having a loop antenna, it is desirable to send a signal with an electric strength as strong as possible. However, the electric strength is regulated by the radio law. Therefore, it is desirable to make an adjustment and ship the medium as a storing medium having the very highest electric field strength the regulation range will permit. If the electric field strength is calculated in a design stage and actual measured data is derived, then a portion other than the antenna portion functions as an antenna, and a very large difference occurs between the theoretical value and the actual value. In such a state that the electric field strength cannot be controlled accurately, therefore, there is a problem that it is impossible to design and ship the medium as a storing medium having the very highest electric field strength the radio law will permit.

BRIEF SUMMARY OF THE INVENTION

An object of the present invention is to provide a loop antenna for accurately implementing the electric field strength requested by the radio law by providing ground in parallel to the main body of the antenna to stabilize the electric field characteristic and making the design value of the antenna coincide with the actual measured value, and a removable data storing medium using this loop antenna.

In accordance with the present invention, an antenna device includes a loop antenna main body having a predetermined aperture area, and a conductor element insulated from the loop antenna main body, connected to a ground potential, and formed in parallel with the loop antenna main body.

In the above described configuration according to the present invention, the conductor element insulated from the loop main body is disposed in parallel with the loop main body which tends to become unstable in the electric field characteristic. As a result, the conductor element functions as the ground for the antenna main body. Since the electric field characteristic of the antenna main body can thus be stabilized, it becomes possible to bring the electric field strength in the design stage close to that in the actual measurement stage as compared with the conventional technique. In the design stage, therefore, it becomes possible to calculate the accurate electric field strength. It thus becomes possible to implement a loop antenna having a characteristic of a value which is infinitely close to the electric field strength requested by the radio law. As a result, the output of, for example, the removable data storing medium using this loop antenna has an electric field strength which is infinitely close to the electric field strength permitted by the radio law. As compared with the conventional technique, therefore, a higher value can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a configuration diagram schematically showing a typical example of a loop antenna;

FIG. 5 is a schematic diagram showing a radiation system and a measurement system of a loop antenna;

FIG. 6 is a diagram showing a radiant electric field strength model from a minute loop coil;

FIG. 10 is a side view schematically showing the configuration of a loop antenna according to a second embodiment;

FIG. 11 is a side view schematically showing the configuration of a loop antenna according to a third embodiment;

FIG. 12A is a top view schematically showing the configuration of a loop antenna according to a fourth embodiment;

FIG. 12B is a side view schematically showing the configuration of a loop antenna according to the fourth embodiment;

FIG. 13 is a circuit diagram showing an example of a matching circuit;

DETAILED DESCRIPTION OF THE INVENTION

Figure 1:
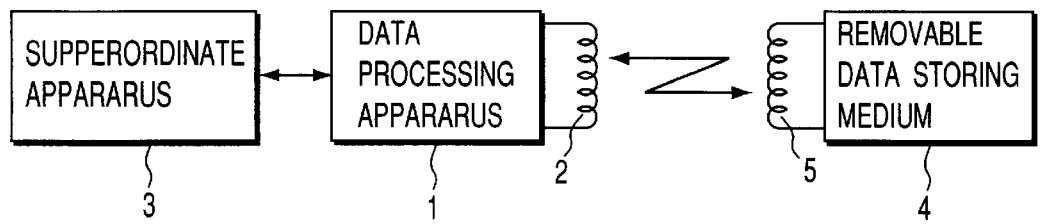
FIG. 1 is a block diagram schematically showing the configuration of a radio communication system.

Hereafter, embodiments of the present invention will be described by referring to the drawing.

FIG. 1 schematically shows the configuration of a radio communication system according to the present embodiment. With reference to FIG. 1, this radio communication system includes a data processing apparatus 1 having a radio communication function, a loop antenna 2 of the data processing apparatus 1, a superordinate apparatus 3 for the data processing apparatus 1, a removable data storing medium 4 having a radio communication function, and a loop antenna 5 of the removable data storing medium 4. The data processing apparatus 1 conducts radio transmission and reception with the removable data storing medium. Thereby the data processing apparatus 1 transmits data to the removable data storing medium 4 and receives data therefrom. As a result, predetermined data processing is conducted.

Figure 2:
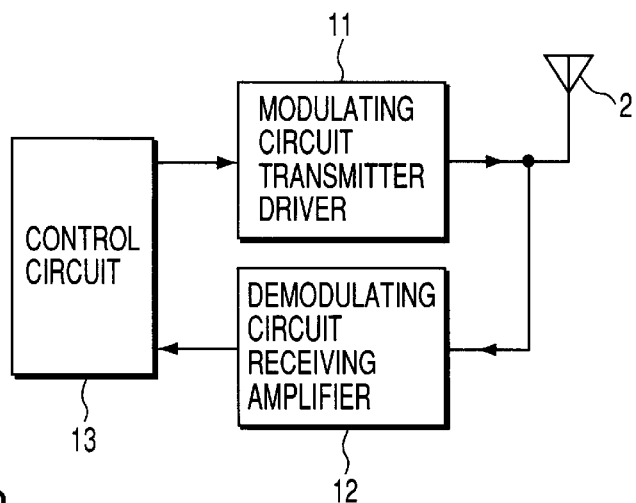
FIG. 2 is a block diagram schematically showing an example of a basic configuration of a data processing apparatus.

FIG. 2 schematically shows an example of a basic configuration of the data processing apparatus 1. With reference to FIG. 2, the data processing apparatus 1 includes a modulating circuit transmitter driver 11 and a demodulating circuit receiving amplifier 12. To the modulating circuit transmitter driver 11 and the demodulating circuit receiving amplifier 12, the loop antenna 2 is connected. The data processing apparatus 1 further includes a control circuit 13 for executing various kinds of processing. To the control circuit 13, the modulating circuit transmitter driver 11 and the demodulating circuit receiving amplifier 12 are connected.

Hereafter, an outline of the operation will be described in brief. Data generated by the superordinate apparatus 3 are sent to the control circuit 13. A signal provided with the data in the control circuit 13 is modulated and amplified in the modulating circuit transmitter driver 11 and supplied to the loop antenna 2. The loop antenna 2 radiates the signal supplied from the modulating circuit transmitter driver 11 into space as a radio wave.

On the other hand, a radio wave transmitted from the removable data storing medium 4 is received by the loop antenna 2 of the data processing apparatus 1, and sent to the demodulating circuit receiving amplifier 12. In the demodulating circuit receiving amplifier 12, processing such as amplification and demodulation is conducted on the received signal, and received data is obtained. The received data thus obtained is sent to the control circuit 13. In the control circuit 13, predetermined processing based upon the received data is conducted.

Figure 16A:
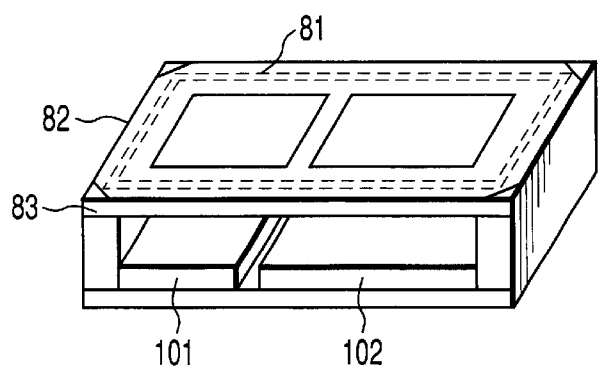
FIG. 16A is an exterior view of a removable data storing medium having a loop antenna of the present invention.
Figure 16B:
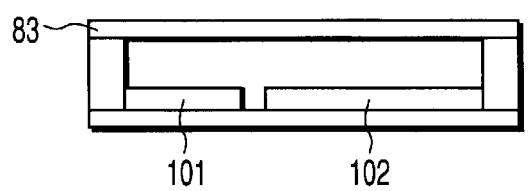
FIG. 16B is a side view of the removable data storing medium having the loop antenna of the present invention.

FIG. 16A is an exterior view of the removable data storing medium having the loop antenna of the present invention. FIG. 16B is a side view of the removable data storing medium having the loop antenna of the present invention. By FIGS. 16A and 16B, an example of the removable data storing medium having the loop antenna of the present invention is shown. The loop antenna which is a feature of the present invention will hereafter be described in detail.

Figure 3:
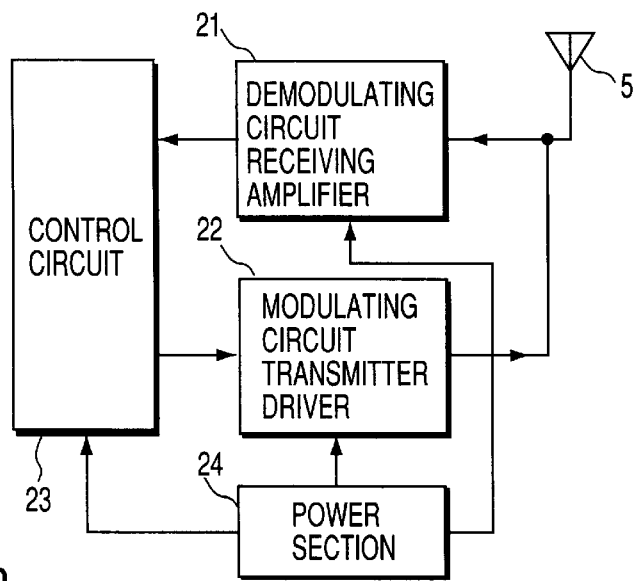
FIG. 3 is a block diagram schematically showing an example of a basic configuration of a removable data storing medium.

FIG. 3 schematically shows an example of a basic configuration of the removable data storing medium 4. With reference to FIG. 3, the removable data storing medium 4 includes a demodulating circuit receiving amplifier 21 and a modulating circuit transmitter driver 22. To the demodulating circuit receiving amplifier 21 and the modulating circuit transmitter driver 22, the loop antenna 5 is connected. The removable data storing medium 4 further includes a control circuit 23 for executing various kinds of processing. To the control circuit 23, the demodulating circuit receiving amplifier 21 and the modulating circuit transmitter driver 22 are connected. Furthermore, a power section 23 such as a battery is provided to supply operation power to the respective circuits.

Hereafter, an outline of operation will be described in brief. The radio wave radiated into space by the data processing apparatus 1 is received by the loop antenna 5. The received signal is sent to the demodulating circuit receiving amplifier 21. In the demodulating circuit receiving amplifier 21, processing such as amplification and demodulation is conducted on the received signal to obtain received data. The received data thus obtained is sent to the control circuit 23. In the control circuit 23, predetermined processing based upon the received data is conducted.

On the other hand, transmission data produced by the control circuit 23, such as return data based upon a result of data processing of the received signal, is sent to the modulating circuit transmitter driver 22. The modulating circuit transmitter driver 22 modulates and amplifies the transmission data, and supplies it to the loop antenna 5. The loop antenna 5 radiates a signal supplied from the modulating circuit transmitter driver 22 into space as a radio wave.

By the way, as the data processing apparatus 1, application to, for example, a radio card reader/writer is conceivable. As the removable data storing medium 4, application to, for example, a radio card used as a commutation ticket or the like is conceivable. In that case, application to, for example, an automatic ticket barrier apparatus is conceivable as the superordinate apparatus 3.

As the power section 24, a battery is used. Alternatively, a power wave may be transmitted from the data processing apparatus 1. By receiving the power wave in the removable data storing medium 4, power used within the removable data storing medium 4 may be generated from the power wave.

Hereafter, the loop antenna 2 used in the data processing apparatus 1 will be described in detail.

FIG. 4 shows a typical example of a loop antenna. If a loop antenna 31 shown in FIG. 4 is replaced by a circuit element, it becomes an inductor. In FIG. 4, the loop antenna is a rectangular loop coil having two turns, and a matching circuit 32 is connected thereto. The matching circuit 32 is a resonance circuit and an impedance conversion circuit. Typically, in the field of radio communication devices, impedance conversion to 50Ω is conducted. Furthermore, a signal source 33 is provided.

In FIG. 5, a radiation system and a measurement system of the loop antenna are shown. In the following description, the loop antenna is considered as that having one turn for brevity. In FIG. 5, a loop antenna 41 having one turn, a matching circuit 42, a signal generator 43, an antenna 44 for measurement, and a spectrum analyzer 45 are provided.

Assuming that the wavelength is λ, λ/2π is approximately 3 m. In other words, the frequency is approximately ten and several MHz. Typically, as the antenna 44, a loop antenna is often used. A signal transmitted from the signal generator 43 is passed through the impedance conversion circuit and the resonance circuit in the matching circuit 42, and radiated from the loop antenna 42.

A radio wave radiated from the loop antenna 41 is received by the antenna 44. A level of a received signal is confirmed in the spectrum analyzer 45. By using factors of the antenna 44, the radiant electric field strength of the loop antenna 41 can be calculated.

FIG. 6 shows a radiant electric field strength model from a minute loop coil. In this model, a minute loop coil 51 considered as a design value, and polar coordinate representation 52 used in the electromagnetics or the like are shown. By the way, formulas concerning the electric field strength and the magnetic field strength at a point P are already known through literature, and they are omitted here.

Figure 7:
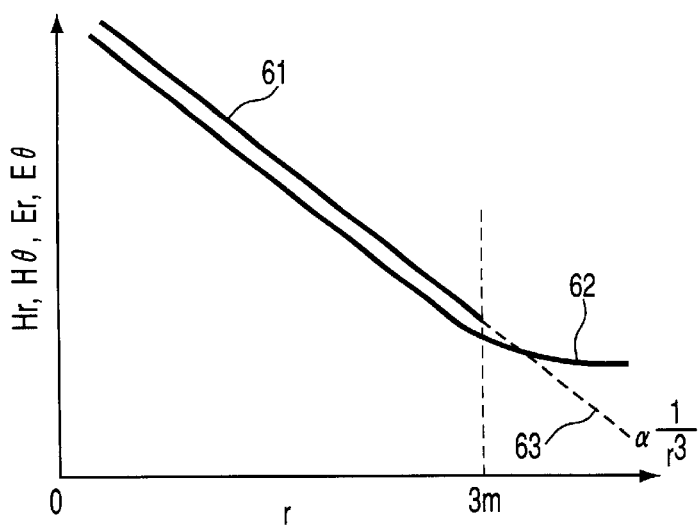
FIG. 7 is a diagram showing a solution of radiation from a minute loop antenna.

FIG. 7 shows a solution of radiation from a minute loop antenna. Letting the distance between the antennas be r, a characteristic curve 61 represents a magnetic field Hr component, and a characteristic curve 62 represents a magnetic field Hθ component. A characteristic curve 63 represents a line of 1/r3. Paying attention to the vicinity of 3 m, it is an area where a 1/r term, a 1/r2 term, and a 1/r3 term in the Hr component and the Hθ component are equal, and the calculated value does not readily coincide with the actually measured value. If a transmission antenna of bad performance is used and an electric field strength at this point is measured, an electric field strength largely different from its design value is measured.

Figure 8:
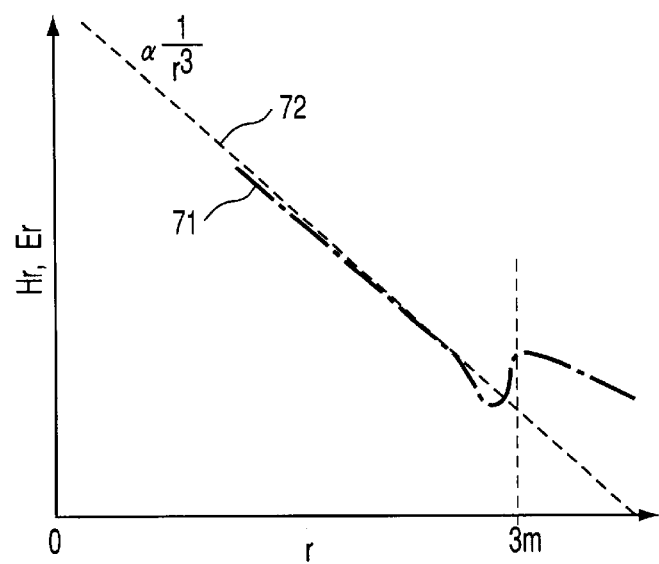
FIG. 8 is a diagram showing an example of a distance versus a radiant electric field (magnetic field) in the case where an antenna of bad performance is used.

FIG. 8 shows an example of distance versus radiant electric field (magnetic field) strength in the case where an antenna of bad performance is used. Originally, the Hr component is important in antennas. Therefore, only the Hr component is shown in the graph of FIG. 8. A characteristic curve 71 shows measured values, and a characteristic curve 72 shows a line of 1/r3. As evident from FIG. 8, the characteristic curve 71 largely differs from the design value, and dips in the vicinity of 3 m. Therefore, the component is largely disturbed thereafter.

By applying the present invention, therefore, the above described problem can be solved. Hereafter, it will be described concretely.

Figure 9:
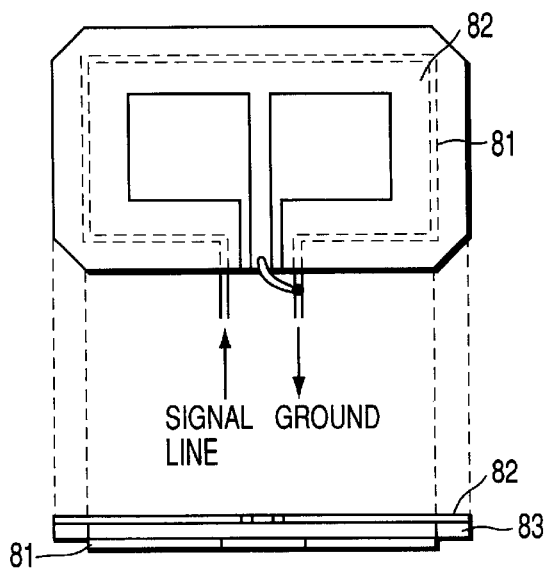
FIG. 9 is a top view schematically showing the configuration of a loop antenna according to a first embodiment, and a side view schematically showing the configuration of a loop antenna according to the first embodiment.

First of all, a first embodiment will hereafter be described. FIG. 9 shows a loop antenna according to a first embodiment. A ground pattern serving as a platelike conductor is disposed along a loop antenna main body. In this example, it is implemented by using a printed wiring board. Alternatively, an ordinary wiring material may be used, and there is no difference in characteristic. In the embodiment hereafter described, the ground pattern is implemented by a printed wiring board.

In FIG. 9, a loop antenna main body 81 having a predetermined aperture area is shown. In the present example, for example, a rectangular loop coil having one turn is used. A printed wiring board 83 is interposed between a ground pattern 82 serving as a platelike conductor and a loop antenna main body 81. The ground pattern 82 is formed across from the loop antenna main body 81 and along the loop antenna main body 81. The ground pattern 82 is connected to a ground terminal (grounding point) of the loop antenna main body 81.

Owing to such a configuration, instability of the electric field characteristic is eliminated by provision of the ground pattern. The actual measured value of the radiant electric field strength is thus brought closer to the design value.

A second embodiment will be hereafter described. FIG. 10 shows a loop antenna according to a second embodiment. On the back side of the antenna main body shown in FIG. 9, a ferrite plate serving as a platelike magnetic substance is disposed. In other words, on a side of the antenna main body 81 across from the printed wiring board 83, a ferrite plate 85 serving as a platelike magnetic substance is disposed via a spacer 84. The spacer 84 is an insulative spacer for adjusting the gap between the ferrite plate 85 and the printed wiring board 83.

The ferrite plate 85 has a high permittivity. The magnetic field strength in the vicinity of the loop antenna main body 81 tends to become large. Therefore, the electric field strength at a distance of 3 m is relatively attenuated together with the electric field strength in the vicinity of the antenna. Furthermore, by disposing the ground pattern 82, the disturbance of the radiant electric field strength at a distance of 3 m can be suppressed.

Hereafter, a third embodiment will be described. FIG. 11 shows a loop antenna according to a third embodiment. In the antenna configuration shown in FIG. 9, a copper plate serving as a platelike conductor is stuck to the back side of the ferrite plate. In other words, a copper plate 86 serving as a platelike conductor is stuck to the back side of a ferrite plate 85 in such a state that electric connection with the ferrite plate 85 is maintained. The copper plate 86 is electrically connected to ground of the loop antenna main body 81. Furthermore, the copper plate 86 is electrically connected to the ferrite plate 85.

In the absence of the copper plate 86, the distance versus electric field strength characteristic is disturbed according to the material of the ferrite plate 85. By disposing the copper plate 86, however, an effect of suppressing the disturbance of the electric field strength in the same way is obtained.

Finally, a fourth embodiment will hereafter be described. FIGS. 12A and 12B show a loop antenna according to a fourth embodiment, and relate to disposition of a feeding point of the rectangular loop antenna main body and the ground pattern. If the loop antenna main body 81 takes the shape of a rectangle having short sides "a" and long sides "b," i.e., b/a>1, then it is necessary to dispose the feeding point near the center of the long side "b" without fail. If the feeding point is disposed on the short side "a" or at an end of the long side "b," the radiant electric field strength pattern at a distance of 3 m is disturbed. Especially, if the transmission antenna is rotated at a distance of 3 m, then the ideal radiant pattern is not observed, and the pattern takes a distorted shape.

In the present example, therefore, a part of a ground pattern 82 is extended from an opposite side toward the feeding point on the long side "b" of the loop antenna main body 81. An extension 82a is connected to ground of the loop antenna main body 81 via a through hole 87 near the feeding point. The through hole 87 is formed in a printed wiring board 83 to connect the extension 82a of the ground pattern 82 to the ground of the loop antenna main body 81.

FIG. 13 shows an example of the matching circuit. The matching circuit includes a loop antenna main body 81, a ground pattern 82, a resonance capacitor 91, a Q adjusting resistor 92, an impedance adjusting capacitor 93, and a connector 94. According to how these components are arranged, the electric field strength characteristic at a distance of 3 m is changed.

Figure 14:
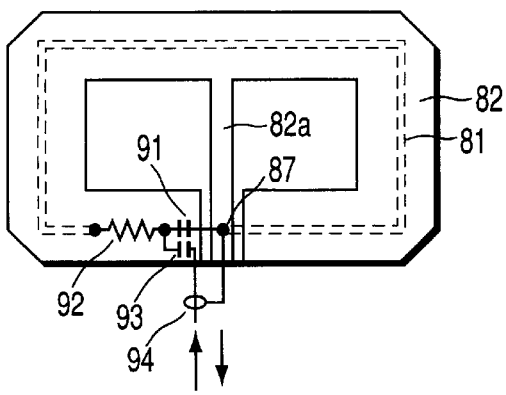
FIG. 14 is a diagram concerning a layout of the matching circuit shown in FIG. 13.

FIG. 14 is a diagram concerning the layout of the matching circuit shown in FIG. 13. The loop antenna the loop antenna main body 81, the ground pattern 82, the resonance capacitor 91, the Q adjusting resistor 92, the impedance adjusting capacitor 93, and the connector 94. It is necessary to dispose the resonance capacitor 91 and the Q adjusting resistor 92 on the line of the loop antenna main body 81 so as to be located on a straight line.

The resonance capacitor 91 and the Q adjusting resistor 92 forms a part of a resonance circuit, and a large current flows through them. Therefore, radiation from these components poses a problem. By disposing the resonance capacitor 91 and the Q adjusting resistor 92 as in the present example, radiation from the resistor 92 and the capacitor 91 can be considered as a part of radiation from the loop antenna main body 81.

Figure 15:
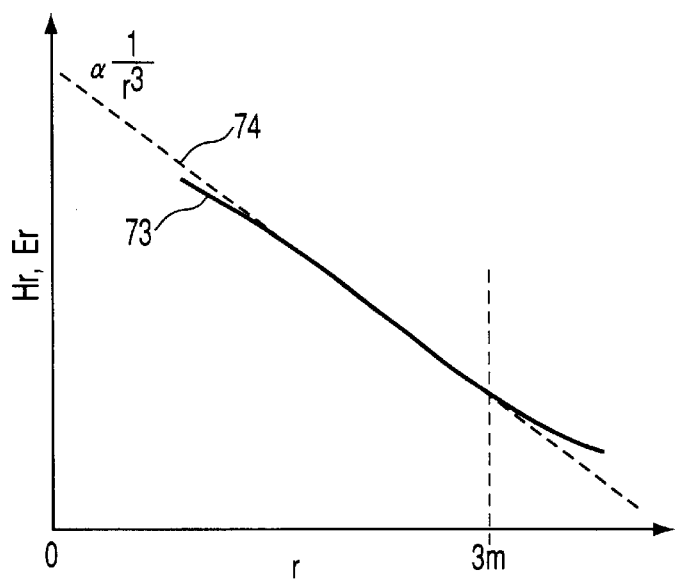
FIG. 15 is a diagram showing an example of measured values for the antenna configuration shown in FIG. 14.

FIG. 15 shows an example of actually measured values in the antenna configuration shown in FIG. 14. In trial manufacture conducted lately, the actually measured value could be let in an error of approximately 1 dB from the design value. In FIG. 15, a characteristic curve 73 represents a line of 1/r3 and a characteristic curve 74 represents actually measured values.

In the embodiments heretofore described, it becomes possible to bring the actually measured value at a distance of approximately 3 m closer to the design value, which is the subject of the present invention, by forming the ground pattern across from the side of the loop antenna main body, by disposing the resonance capacitor and the Q adjusting resistor in the antenna resonance circuit so as to be in series with the loop antenna main body, by disposing the ferrite plate on the same side of the loop antenna main body at a predetermined distance, by sticking the copper plate to the back of the ferrite plate while providing conductivity to the copper plate and connecting the copper plate to the ground of the loop antenna main body, and by adopting such a configuration as to take out the feeding point from the long side without fail.

As heretofore described in detail, the present invention is capable of making the actually measured value of an antenna coincide with the design value by providing the ground in parallel with the antenna main body and thus stabilizing the electric field characteristic, and providing a loop antenna implementing accurately the electric field strength requested by the radio law, and a removable data storing medium using this loop antenna.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An antenna device comprising:
    a loop antenna main body having a predetermined aperture area;
    a conductor element insulated from the loop antenna main body, connected to a ground potential, and formed in parallel with the loop antenna main body;
    a ferrite plate disposed across the loop antenna main body from the conductor element at a predetermined distance, the ferrite plate having a size equal to or larger than a size of the loop antenna main body; and
    a copper plate electrically connected to the ferrite plate, and stuck to the ferrite plate across from the loop antenna main body.

2. An antenna device according to claim 1, further comprising:
    a resonance capacitor and a Q adjusting resistor forming the loop antenna, the resonance capacitor and the Q adjusting resistor being disposed on a line of the loop antenna main body so as to be on a straight line.

3. An antenna device according to claim 1, further comprising:
    an insulative board provided to support the conductor element, the board taking the shape of a rectangle having long sides and short sides, the board having a through hole for connecting an extension of the conductor element to ground of the loop antenna main body at the center of a long side.

4. An antenna device according to claim 3, further comprising:
    a resonance capacitor and a Q adjusting resistor forming the loop antenna, the resonance capacitor and the Q adjusting resistor being disposed near a center of a long side of the loop antenna main body so as to be on a straight line.

5. A portable data processing apparatus comprising:
    a loop antenna main body having a predetermined aperture area;
    a conductor element insulated from the loop antenna main body, connected to a ground potential, and formed in parallel with the loop antenna main body;
    transmitting/receiving means for transmitting and receiving predetermined information with an external data processing apparatus by transmitting and receiving radio waves via the loop antenna main body;
    data processing means for conducting predetermined processing on the predetermined information transmitted and received by the transmitting/receiving means;
    a ferrite plate disposed across the loop antenna main body from the conductor element at a predetermined distance, the ferrite plate having a size equal to or larger than a size of the loop antenna main body; and
    a copper plate electrically connected to the ferrite plate, and stuck to the ferrite plate across from the loop antenna.

6. A portable data processing apparatus according to claim 5, further comprising:
    a resonance capacitor and a Q adjusting resistor forming the loop antenna, the resonance capacitor and the Q adjusting resistor being disposed on a line of the loop antenna main body so as to be on a straight line.

7. A portable data processing apparatus according to claim 5, further comprising:
    an insulative board provided to support the conductor element, the board taking the shape of a rectangle having long sides and short sides, the board having a through hole for connecting an extension of the conductor element to ground of the loop antenna main body at the center of a long side.

8. A portable data processing apparatus according to claim 7, further comprising:
    a resonance capacitor and a Q adjusting resistor forming the loop antenna, the resonance capacitor and the Q adjusting resistor being disposed near a center of a long side of the loop antenna main body so as to be on a straight line.

9. An antenna device comprising:

a loop antenna main body having a predetermined aperture area;

a conductor element insulated from the loop antenna main body, connected to a ground potential, and formed in parallel with the loop antenna main body;

a magnetic substance disposed across the loop antenna main body from the conductor element at a predetermined distance, the magnetic substance having a size equal to or larger than a size of the loop antenna main body; and a copper plate electrically connected to the magnetic substance, and stuck to the magnetic substance across from the loop antenna main body.

* * * * *